(12) United States Patent  
Dinger et al.

(10) Patent No.: US 8,364,683 B2  
(45) Date of Patent: Jan. 29, 2013

(54) IMPORTING AND RECONCILING RESOURCES FROM DISJOINT NAME SPACES TO A COMMON NAMESPACE

(75) Inventors: John E. Dinger, Cary, NC (US); Jacob Yackenovich, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 11/847,806

(22) Filed: Aug. 30, 2007

(65) Prior Publication Data

US 2009/0063562 A1    Mar. 5, 2009

(51) Int. Cl.
G06F 7/00    (2006.01)
G06F 17/30    (2006.01)

(52) U.S. Cl. ........ 707/740; 707/705; 707/726; 707/737; 707/756

(58) Field of Classification Search .................. None
See application file for complete search history.

(56) References Cited

U.S. PATENT DOCUMENTS

| | | | |
|---|---|---|---|
| 6,834,284 B2 | 12/2004 | Acker et al. | 707/103 |
| 7,454,437 B1* | 11/2008 | Lavallee et al. | 707/999.103 |
| 2005/0114359 A1* | 5/2005 | Li et al. | 707/100 |
| 2006/0106824 A1* | 5/2006 | Stuhec | 707/100 |
| 2006/0136585 A1* | 6/2006 | Mayfield et al. | 709/224 |

OTHER PUBLICATIONS

IBM Corporation "IBM Tivoli Application Dependency Discovery Manager" Mar. 2007 (8 Pages).

* cited by examiner

*Primary Examiner* — Jau-Shya Meng

(74) *Attorney, Agent, or Firm* — Hamilton & Terrile, LLP; Stephen A. Terrile

(57) ABSTRACT

A namespace exploits individual resource identity attributes of an application to allow the integration of resource instances from applications into a configuration management database (CMDB), prior to any data cleansing or namespace harmonization activities. An approach for incremental reconciliation of resource instances within the CMDB is defined.

9 Claims, 3 Drawing Sheets

IMPORTING AND RECONCILING RESOURCES FROM DISJOINT NAME SPACES TO A COMMON NAMESPACE

BACKGROUND OF THE INVENTION

The present invention relates in general to data processing systems and in particular to using computers to import and reconcile resources from disjoint name spaces.

One issue inhibiting the integration of applications is the lack of a common naming scheme and namespace to identify resources dealt with by those applications. This is especially problematic in the common case where the applications are dealing with overlapping sets of resources. Configuration management databases (CMDBs) attempt to support the integration of applications by providing an integrated view of resources dealt with by those applications and the relationships among the resources.

A configuration management database provides a repository of information related to all the components (including applications) of an information technology environment. A CMDB can be used to represent a configuration of the components of the IT environment. A CMDB helps an organization understand the relationships between these components and track their configuration. CMDB implementations often involve federation, the inclusion of data into the CMDB from other sources, such as Asset Management, in such a way that the source of the data retains control of the data. For CMDBs to achieve their maximum value, they should be able to quickly and efficiently integrate and reconcile resource information, including identity, from multiple applications, even when the multiple applications lack a common naming schema.

CMDBs such as those addressing reconciliation of resources within a well-defined namespace often require manual data cleansing and harmonization of namespaces prior to integration into the CMDB. A characteristic of such CMDBs is that a name schema and namespace is defined as a data model common to the implementation (i.e., a Common Data Model). With this characteristic, data cleansing or harmonization is often required prior to integration.

BRIEF SUMMARY OF THE INVENTION

In accordance with an aspect of the present invention, a method for importing and reconciling resources from disjoint name spaces that includes applying a default-naming rule on all resource instances, categorizing the resource instances according to a consistent type model, and reconciling the resource instance as additional information about the resource becomes available.

In accordance with an aspect of the present invention, a computer program product for importing and reconciling resources from disjoint name spaces. The computer program product includes a computer usable medium having computer usable program code embodied therewith. The computer usable program code includes computer usable program code configured to apply a default naming rule on all resource instances, computer usable program code configured to categorize the resource instances according to a consistent type model, and computer usable program code configured to reconcile the resource instance as additional information about the resource becomes available.

In accordance with an aspect of the present invention a system that includes a processor, a data bus coupled to the processor, and a computer-usable medium embodying computer program code. The computer-usable medium is coupled to the data bus. The computer program code comprises instructions executable by the processor and configured for applying a default-naming rule on all resource instances, categorizing the resource instances according to a consistent type model, and reconciling the resource instance as additional information about the resource becomes available.

DETAILED DESCRIPTION OF THE INVENTION

Figure 1:
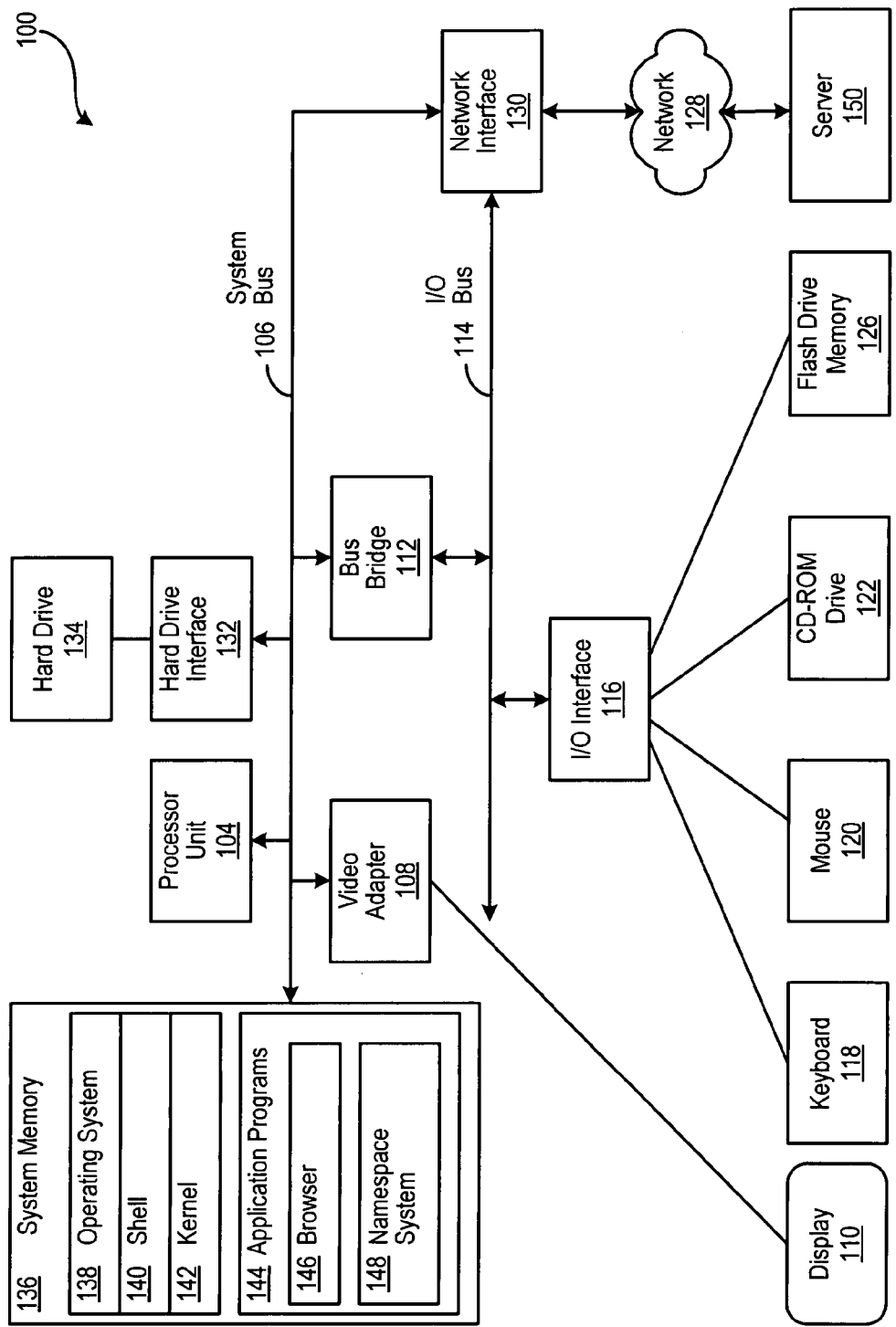
FIG. 1 depicts an exemplary client computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Computer program code for carrying out operations of the present invention may be written in an object oriented programming language such as Java, Smalltalk, C++, or the like. However, the computer program code for carrying out operations of the present invention may also be written in conventional procedural programming languages, such as the "C"

programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes processor unit 104 that is coupled to system bus 106. Video adapter 108, which drives/supports display 110, is also coupled to system bus 106. System bus 106 is coupled via Bus Bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including but not limited to Universal Serial Bus (USB) ports.

Computer 100 is able to communicate with server 150 via network 128 using network interface 130, which is coupled to system bus 106. Network 128 may be an external network such as the Internet, or an internal network such as a Local Area Network (LAN), an Ethernet, or a Virtual Private Network (VPN). In one embodiment, server 150 is configured similarly to computer 100.

Hard drive interface 132 is also coupled to system bus 106. Hard drive interface 132 interfaces with hard drive 134. In one embodiment, hard drive 134 populates system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Data that populates system memory 136 includes Operating System (OS) 138, application programs 144, and database 137. Database 137 includes multiple records of standardized business data. In another embodiment, database 137 may instead be stored in server 150.

OS 138 includes shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes graphical user interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include browser 146 and namespace system 148. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Namespace System 148 performs the functions as discussed below. In one embodiment, Namespace System 148 is included within a software application program or a collection of software application programs, such as a Tivoli Application Dependency Discovery Manager (TADDM), that is called via an Application Programming Interface (API). Namespace System 148 is capable of writing resource and relationship instance data into a system that is accessible to a user or multiple users, such as a Configuration Management Database (CMDB).

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

The namespace system 148 includes code for implementing the processes described below. As noted above, the namespace system 148 can be downloaded to a client computer from service provider server 150. Additionally, in one aspect of the invention, service provider server 150 performs all of the functions associated with the present invention (including execution of the namespace system 148), thus freeing a client computer 100 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Figure 2:
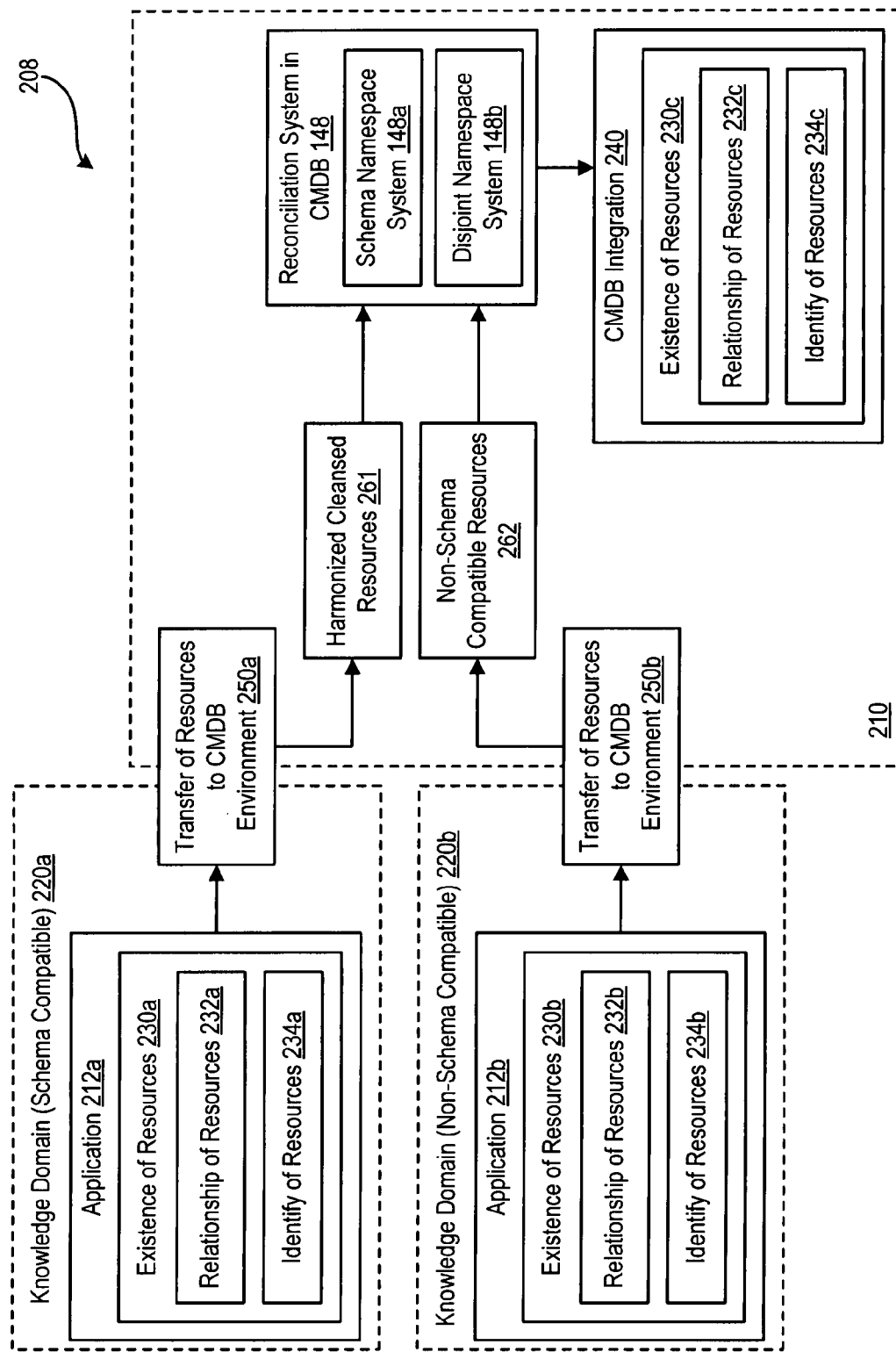
FIG. 2 depicts a block diagram of a CMDB system in which a namespace system is instantiated.

With reference now to FIG. 2, a block diagram of a CMDB system in which the namespace system 148 is instantiated is shown. The namespace system 148 comprises a schema compatible namespace system 148a as well as a disjoint namespace system 148b. The namespace system 148 operates within an information technology (IT) environment 200, and specifically within a CMDB system 210 of the IT environment 200. The CMDB system 210 integrates a plurality of applications 212. Each application 212 within the IT environment 200 includes a knowledge domain 220. The knowledge domain comprises 220 an awareness of the existence of resources 230 and an awareness of the relationships among the resources 232. The knowledge domain 220 also comprises an identity of the resources 234.

The IT environment 200 also comprises a resource transfer module 250 which is responsible for the transfer of information about the existence of resources (e.g., resources 230a from an application (e.g., application 212a) to the existence of resources 230c in the CMDB system 210. The resource transfer module 250a (i.e., a schema compatible resource transfer module) transfers schema compatible resources 261. Schema compatible resources 261 are resources from a separate knowledge domain 220a that share the same naming schema and namespace as the CMDB system 210. The resource transfer module 250b (i.e., a non-schema compatible resource transfer module) transfers non-schema compatible resources 262. Non-schema compatible resources are resources from a separate knowledge domain 220b that do not share the same naming schema and namespace as the CMDB system 210.

While two applications (e.g., 212a, 212b) may deal with the same physical and logical resources instances in the IT environment 200, each application 212 can identify the resources according to an individual naming scheme. The individual naming scheme can assign identity attributes that are unique within the knowledge domain of the application. Perceptions of the application 212 regarding the types of the resources within their respective knowledge domains are correlatable by an administrator familiar with resource type domains of the applications. For example, an administrator can recognize that the type "ComputerServer" in the knowledge domain of application X has the type "ComputerSystem" in the knowledge domain of application Y.

The namespace system 148 exploits the individual resource identity attributes of an application to allow the integration 240 of resource instances from applications into the CMDB system 210. The namespace system 148 further defines an approach for incremental reconciliation of resource instances within the CMDB where a plurality of conditions are true. The plurality of conditions include whether the application has unique identifiers for its resources that are consistent across time (if the application finds the same resource twice it will identify the resource the same way both times); and, the application has a map of the resource types in a knowledge domain of the application with fidelity to the resource types in the type model of the CMDB (e.g., AIXOperatingSystem is mappable to AIX_OS.)

In certain embodiments, the knowledge domain 220 of the application produces a unique identity attribute for each managed resource. In certain embodiments, this unique identity attribute is referred to as a managed system name (ManagedSystemName) attribute. The managed system name attribute is used with applications that have an awareness of a type of object instance, but not necessarily sufficient information to satisfy Common Data Model naming rules from the CMDB system 210 for the object type. The managed system name attribute corresponds to a resource within an application's knowledge domain 220 and namespace. Within the CMDB system 210, usage of the application's managed system name attribute is a last-choice alternative for identifying resource instances (see e.g., the default naming rule step 310 below). This naming rule allows resource instances from non-schema compatible knowledge domains 220b to be imported to the CMDB system 210. When this naming rule is used by an application, there is a high risk that the resource will not correlate initially with other instance data in the CMDB system 210.

Additionally, to permit resource data to exist as a Common Data Model resource instance, the disjoint namespace system 148b uses the managed system name attribute for resources that do not contain enough data to meet other naming rules. There is no restriction on the contents of the managed system name attribute. At a minimum, the managed system name attribute contains an identify value 234b that is known and unique to a single application knowledge domain 220b and that is consistent across time. As a best practice, the contents of the managed system name attribute contain identity values for a resource instance that are known to more than one management technology (i.e., that are known across applications 212 in different knowledge domains 220).

By using the managed system name attribute within the application, a rapid integration solution with a particular management technology and consumers of this data, such as the CMDB system 210, is enabled. This attribute thus enables users of the CMDB system 210 to perform operations (e.g., view, query, update, delete) on selected categories of resources instances (see e.g., step 312 below). For example, the categories of resources can include all DB2 database manager resources. As more resource instances from additional knowledge domains 220 are loaded into the CMDB system 210, those resources will also contain additional information (see e.g., step 360 below) that match other Common Data Model naming rules as well as the managed system name attribute. Thus, as more information about previously loaded resource instances is loaded over time from new knowledge domains 220 or from previously loaded knowledge domains, sufficient data will be available to allow the reconciliation operations of namespace system 148a to perform incremental reconciliation (see e.g., step 350 below) of resource instances named by the managed system name attribute.

Figure 3:
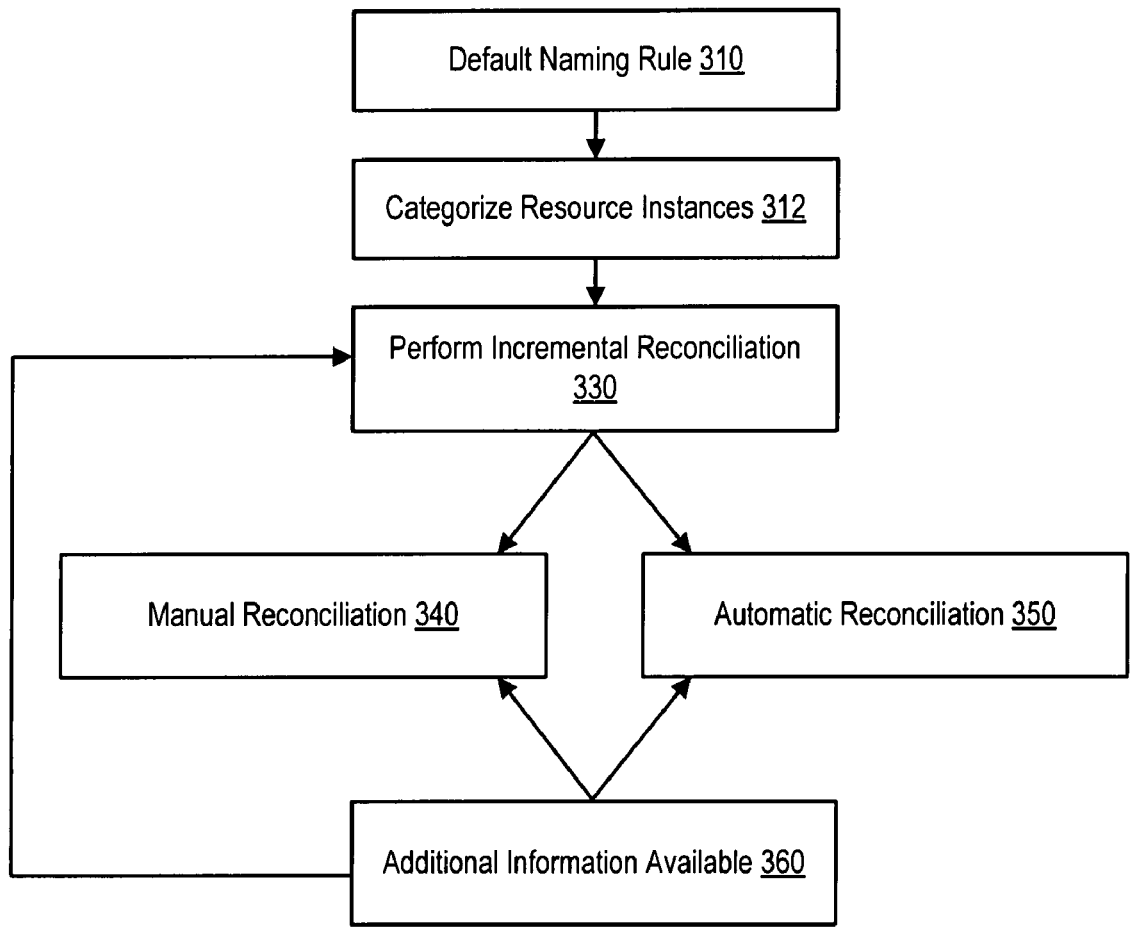
FIG. 3 depicts a flow chart of the operation of a namespace system.

Referring to FIG. 3, a flow chart of the operation of the namespace system 148 is shown. More specifically, to read information from applications whose namespace and schema is disjoint from the CMDB's native namespace and schema, the namespace system 148 provides a default-naming rule on all concrete resource classes that allows a unique identity string of an application to be used to identify a CMDB instance at step 310. Because the CMDB's namespace system 148 provides a default-naming rule, applications can integrate resource instances of the application into the CMDB having aligned namespaces or naming schemas. Next, at step 312, for a given the resource type mapping, the resource instances read from the application are now categorized correctly according to a consistent type model by the namespace system 148.

For example, the CMDB could read ComputerSystem instances from an Inventory Application that inventories servers in an IT environment. The requirement would be that the application's administrator recognizes that the "servers" of the Inventory Application are CMDB "ComputerSystems." The result is that data integrated in the CMDB such that queries for "Show me all my ComputerSystems" would be able to return not only the ComputerSystem instances that fully conform to the CMDB's native namespace and schema, but also those that were brought in via the Inventory Application. At this point, there is the potential for redundant instances in the CMDB due to incomplete reconciliation.

Next, the namespace system 148 performs an incremental reconciliation operation at step 330. The incremental reconciliation operation can include both manual reconciliation 340 and automated reconciliation 350. As additional information becomes available about the resources stored by applications in the CMDB as determined at step 360, that namespace system 148 may be able to access additional identity attributes that align with the identity attributes used by the CMDB system 210.

When performing a manual reconciliation operation 340, a user (such as an IT administrator) recognizes from the additional attributes of an application that instances from multiple sources reconcile to the same or different instances. The namespace system 148 enables a user to perform such a manual reconciliation.

When performing an automatic reconciliation 350, the namespace system 148 uses attribute matching operations (and possibly other heuristic identity matching approaches) to reconcile the resources stored by applications with other resources already present within the CMDB. As soon as sufficient matching identity attributes are stored on resource instances of a given class, the namespace system 148 can recognize the resources as a single resource instance. For example, as soon as an application updates a ComputerSystem instance with "Manufacturer, Model, and Serial Number" attributes that match a second instance of class ComputerSystem in the CMDB system 210, the two instances may be reconciled to a single instance of ComputerSystem. The resultant instance in the CMDB system 210 is a union of the disjoint attribute sets of the resource instances and a merge of the matching attribute sets of the resource instances. The namespace system 148 may apply reconciliation heuristics on any matching attributes that had inconsistent values.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block might occur out of the order noted in the figures. For example, two blocks shown in succession maybe executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for importing and reconciling resources from disjoint name spaces comprising:

applying, via a computer system, a default-naming rule on a plurality of resource instances;

categorizing, via the computer system, the plurality of resource instances according to a consistent type model, the plurality of resource instances comprising schema compatible resource instances and non-schema compatible resource instances, the schema compatible resource instances sharing a naming schema with a configuration management database (CMDB) system and the non-schema compatible resource instances not sharing a naming schema with the CMDB system, the categorizing the plurality of resource instances further comprising exploiting individual resource identity attributes from applications within a specific knowledge domain to provide integration of resource instances across knowledge domains into the CMDB system having aligned namespaces or naming schemas and determining whether the plurality of resource instances have unique identity attributes within the specific knowledge domain, the unique identity attributes being consistent across time; and, reconciling, via the computer system, a resource instance of the plurality of resource instances as additional information about the resource instance becomes available, the additional information being stored by the application from new knowledge domains or from previously loaded knowledge domains into the CMDB system, the reconciling the resource instance further comprising determining whether a resource of an application corresponds to a known resource type within the specific knowledge domain, the known resource type corresponding to an individual resource identify attribute; and confirming the known resource type is accurately mapped to a corresponding resource type in the configuration management database CMDB system where at least one of a plurality of conditions are present; and, storing a resultant resource instance in the CMDB system, the resultant resource instance being a union of disjoint attribute sets of resource instances and a merge of matching attribute sets of the plurality of resource instances.

2. The method of claim 1 wherein:

the default naming rule comprises a unique identity attribute within a knowledge domain, the unique identity attribute comprising a managed system name attribute and, applications in the knowledge domain have an awareness of a type of object instance, while not necessarily having sufficient information to satisfy Common Data Model naming rules.

3. The method of claim 1 wherein reconciling the resource instance as additional information about the resource becomes available further comprises:

performing at least one of a manual reconciliation and an automated reconciliation.

4. A non-transitory computer program product to import and reconcile resources from disjoint name spaces, the computer program product comprising:

a tangible computer usable storage medium having computer usable program code embodied therewith, the computer usable program code comprising:

computer usable program code configured to apply a default-naming rule on a plurality of resource instances;

computer usable program code configured to categorize the plurality of resource instances according to a consistent type model, the plurality of resource instances comprising schema compatible resource instances and non-schema compatible resource instances, the schema compatible resource instances having a naming schema with a configuration management database CMDB system and the non-schema compatible resource instances not sharing a naming schema with the CMDB system, the categorizing the plurality of resource instances further comprising exploiting individual resource identity attributes from applications within a specific knowledge domain to provide integration of resource instances across knowledge domains into the CMDB system having aligned namespaces or naming schemas; and computer usable program code configured to reconcile a resource instance of the plurality of resource instances as additional information about the resource becomes available, the additional information being stored by the application from new knowledge domains or from previously loaded knowledge domains into the CMDB system, the computer usable program code configured to reconcile further comprising computer usable program code configured to:

determine whether a resource has unique identity attributes within the specific knowledge domain, the unique identity attributes being consistent across time, the resource comprising the unique identify attributes; and, confirm the known resource type is accurately mapped to a corresponding resource type in the CMDB system, the resource type being accurately mapped where at least one of a plurality of conditions are present; and, storing a resultant resource instance in the CMDB system, the resultant resource instance being a union of disjoint attribute sets of resource instances and a merge of matching attribute sets of the plurality of resource instances.

5. The non-transitory computer program product of claim 4 wherein:

the default naming rule comprises a unique identity attribute within a knowledge domain, the unique identity attribute comprising a managed system name attribute, and, applications in the knowledge domain have an awareness of a type of object instance while not necessarily having sufficient information to satisfy Common Data Model naming rules.

6. The non-transitory computer program product of claim 4 wherein the computer usable program code configured to reconcile further comprises computer usable program code configured to:

perform at least one of a manual reconciliation and an automated reconciliation.

7. A system comprising:

a processor;

a data bus coupled to the processor; and an apply module to apply a default-naming rule on a plurality of resource instances;

a categorize module to categorize the plurality of resource instances according to a consistent type model, the resource instances comprising schema compatible resource instances and non-schema compatible resource instances, the schema compatible resource instances having a naming schema with a configuration management database CMDB system and the non-schema compatible resource instances not sharing a naming schema with the CMDB system, the categorize module exploiting individual resource identity attributes from applications within a specific knowledge domain to provide integration of resource instances across knowledge domains into the CMDB system having aligned namespaces or naming schemas and determining whether the plurality of resource instances have unique identity attributes within the specific knowledge domain, the unique identity attributes being consistent across time; and, a reconcile module to reconcile a resource instance of the plurality of resource instances as additional information about the resource becomes available, the additional information being stored by the application from new knowledge domains or from previously loaded knowledge domains into the CMDB system, the reconcile module further comprising a determine module to determine whether a resource of an application corresponds to a known resource type within the specific knowledge domain;

a confirm module for confirming the known resource type is accurately mapped to a corresponding resource type in the CMDB system, the resource type being accurately mapped where at least one of a plurality of conditions are present; and, a store module for storing a resultant resource instance in the CMDB system, the resultant resource instance being a union of disjoint attribute sets of resource instances and a merge of matching attribute sets of the plurality of resource instances.

8. The system of claim 7 wherein:

the default naming rule comprises a unique identity attribute within a knowledge domain, the unique identity attribute comprising a managed system name attribute, and, applications in the knowledge domain have an awareness of a type of object instance while not necessarily having sufficient information to satisfy Common Data Model naming rules.

9. The system of claim 7 wherein the reconcile module further comprises a reconciliation module to perform at least one of a manual reconciliation and an automated reconciliation.

* * * * *